Patented Aug. 24, 1926.

1,597,170

UNITED STATES PATENT OFFICE.

ARNOLD ROEDOLF FRANS VAN DER MARK, OF WELTEVREDEN, AND HEIN KREMER, OF MELOEWOENG, DUTCH EAST INDIES.

PROCESS OF MAKING OBJECTS FROM UNVULCANIZED RUBBER AND OBJECTS FROM UNVULCANIZED RUBBER.

No Drawing. Application filed August 8, 1925, Serial No. 49,154, and in the Netherlands July 11, 1924.

This invention relates to a process for making articles from unvulcanized rubber and to articles produced in accordance with such process from unvulcanized rubber.

Recently unvulcanized rubber has been put on the market in several forms and more especially as crepe, sheet, etc., whether smoked or unsmoked or treated in another way. For this purpose the latex from the rubber tree was coagulated, after which the coagulum was transformed into the above mentioned articles, for instance, by rollers. In this way a well known market product was obtained which serves as raw material for the manufacture of suitable articles whereby vulcanization was applied.

This invention enables the manufacture of many of these articles of consumption to be effected without vulcanization, from the unvulcanized product and may also serve for preparing a staple product from latex.

According to the invention closed or open receptacles are formed from the preferably fresh coagulum, after which the walls of these receptacles are expanded or stretched by means of pressure which is generated by the aid of a gaseous, liquid or solid medium.

By "coagulum" is understood hereinafter freshly coagulated rubber, viz the product as it is obtained from rubber latex by means of a coagulating substance. It will be clear, however that coagulated rubber, which has been kept by artificial means in a condition corresponding with the "freshly coagulated" state, may also be used, though it is preferred, to use really freshly coagulated rubber.

It has been suggested already to employ unvulcanized rubber in relatively thick layers, for certain purposes as for instance, sole-mounting.

It is known that the latex is coagulated at the rubber estates in trays of fixed sizes preferably by means of an acid; thereafter the coagulated mass is worked to a thinner and more solid sheet of about 1 to 2 m.m. thickness by means of a roller. It was impossible in this way to obtain a thinner sheet, as the softer coagulum is apt to crack beyond the above limit and further repeated rolling is uneconomical. Subsequently those sheets are generally provided with a pattern (mostly rhombic) and thereafter smoked in so called smoking houses, which treatment has for its purpose to dry the rubber and further to protect it somewhat against the growing of mould.

It is also known to coagulate the latex in a large container and then to cut or to draw the coagulum into pieces or lumps, for subsequently creping those pieces in mechanically driven rollers. This creping comprises drawing out and levelling of the coagulum by successive rolling operations with rollers having successively decreasing grooves and thereafter rolling the planed mass by smooth rollers to a coherent mass till the desired crepe-shape is obtained, after which it is naturally or artificially dried.

In preparing sheet or crepe rubber heavy machines are required for creping, while smoking and drying-houses have to be employed as in slowly drying "sheet" and "crepe" otherwise there is a risk of mould-growing.

It is also known to join fresh raw rubber by pressure which has been applied already in preparing an equal crepe and in making rubber articles. This has also been applied in making hollow rubber-articles as, for instance, balls, gas being forced into the articles to be made, in order to cause the rubber to fit closely to the wall of the mould. Drawing out vulcanized rubber or coagulum to very thin walls has, however, never been applied, though vulcanized rubber has been blown out into thin bodies such as balloons.

In applying the present invention, the above mentioned drawbacks are removed and further no expensive machines are required.

The preferably freshly prepared and consequently still wet coagulum has, as is known, in that state the striking property that a tight adherence is possible by a simple pressing of the parts together. When, for instance parts of such a sheet or two or more of these sheets are placed on each other the edges can be caused to adhere by pressing them together. If, for instance, this pressing together is not exerted all over the edges, then adherence will not be effected at places where the pressure is ineffective or not applied and these places can thus be used for the introduction of a gaseous, liquid or solid medium between the superimposed parts or sheets.

Further, according to the invention, one or more than one of such sheets can be positioned or placed above a chamber which can be evacuated so that on withdrawing or aspiring the gaseous medium, the sheet or sheets, being ductile, will form an open receptacle.

In order to explain the process according to the present invention the following remarks are relevant:

If, for instance, the edges of two freshly prepared sheets are attached to each other in such a way that at a certain place or spot adherence is not effected, then at the place or spot a gaseous medium can be injected under pressure between the sheets by means of an air pump or the like. Care must be taken, however, in that case to press temporarily the said opening tightly fitting around the extremity of the gas conduit, which can be effected in a very simple way. In blowing or pumping in the gas the superimposed sheets will stretch out, and the product in that shape is very ductile, and by completely joining the edges the receptacle thus made can be hermetically closed.

Dependent on the volume and pressure of the air blown in, the ductility of the walls may be retained although the walls become extremely thin (for instance fractions of a millimetre) yet they remain quite intact and air tight.

As soon as in this way, either by injection, or by the aspiration of a suitable medium, a receptacle is obtained and the rubber walls are drawn out to the desired extent, then the rubber can be dried very quickly in that state, even without artificial heating (after the removal of the supply conduit for the air from whatever source and after having closed the opening between the edges by pressing them together). In this way an open or closed receptacle of dry rubber walls is obtained in a very short time, which receptacle may be used as for any desired purpose.

According to the invention the open or closed receptacle may be so shaped that it corresponds with the shape of the article, desired.

In general, such a rubber receptacle can be given practically any desired shape or volume, which however is dependent on the shape and the size of the sheets originally superimposed. It will also be possible to influence the shape of the rubber receptacle by the equality of or the difference in thickness of the sheets or parts thereof originally superimposed.

It follows therefore that to a certain extent the shape of the extremely thin walls may vary as this depends to a certain extent on the shape of the aforesaid receptacle and also to the fact that after allowing the gas or air to escape there is not much shrinkage of any of the rubber walls.

The open or closed thin walled receptacles thus obtained can, according to the invention, be used in various ways. Thus, for example, it is possible to make of the closed receptacle a playing ball, of the open receptacle a bath cap and a lining or the like of the very thin wall.

Moreover it appears possible to paint, colour or embellish in any suitable way the thin rubber walls as well as the receptacle made therefrom, or to cover and to strengthen them with other materials for various purposes.

The articles may be coloured by adding the desired dyestuff to the latex. Further binding materials may be previously added to the latex.

According to the purpose for which the article is intended the strengthening of the receptacle and of the walls is separately possible in any suitable way and such strengthening may be effected interiorly or exteriorly or both interiorly or exteriorly by coiling around, covering or pasting the article with various proper materials or means and in many ways.

Finally, the extremely thin walls are pre-eminently suitable for cold vulcanization, either with combinations of chlorides of sulphur or with the aid of sulphur dioxide and hydrogen sulphide.

Further the present process provides an extraordinarily quick drying and stable product from the latex without using expensive machines and may be placed on the market in the crepe or sheet form. It is thus possible to make the raw material for the manufacture of the so-called "blanket crepe" after converting the dry thin walls or membranes to this purpose.

The unvulcanized products may particularly be used as packing material for wares, requiring a hermetical insolation for transporting or storing purposes, without coming into contact with sulphur or combinations of sulphur.

We claim:

1. A process for drying rubber, characterized in that receptacles are moulded from substantially fresh coagulum after which the walls of these receptacles are expanded by means of differential pressure.

2. A process for making rubber articles, characterized in that receptacles are moulded from substantially fresh coagulum after which the walls of these receptacles are expanded by means of differential pressure.

3. Unvulcanized rubber, characterized by walls expanded to thin sheets obtained from receptacles of substantially fresh coagulum by differential pressure.

4. Rubber articles, characterized by walls, expanded from receptacles of substantially fresh coagulum by differential pressure.

In testimony whereof we affix our signatures.

ARNOLD ROEDOLF FRANS van der MARK.
HEIN KREMER.